US010739480B2

(12) United States Patent
Akcelik et al.

(10) Patent No.: US 10,739,480 B2
(45) Date of Patent: Aug. 11, 2020

(54) FULL WAVEFIELD INVERSION WITH REFLECTED SEISMIC DATA STARTING FROM A POOR VELOCITY MODEL

(71) Applicants: Volkan Akcelik, Spring, TX (US); Anatoly I. Baumstein, Houston, TX (US); Valeriy V. Brytik, Houston, TX (US); Sunwoong Lee, Houston, TX (US); Yaxun Tang, Spring, TX (US)

(72) Inventors: Volkan Akcelik, Spring, TX (US); Anatoly I. Baumstein, Houston, TX (US); Valeriy V. Brytik, Houston, TX (US); Sunwoong Lee, Houston, TX (US); Yaxun Tang, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 285 days.

(21) Appl. No.: 15/893,898

(22) Filed: Feb. 12, 2018

(65) Prior Publication Data
US 2018/0275300 A1 Sep. 27, 2018

Related U.S. Application Data

(60) Provisional application No. 62/476,206, filed on Mar. 24, 2017.

(51) Int. Cl.
*G01V 1/28* (2006.01)
*G01V 1/30* (2006.01)
*G01V 99/00* (2009.01)

(52) U.S. Cl.
CPC ............. *G01V 1/282* (2013.01); *G01V 1/303* (2013.01); *G01V 1/306* (2013.01); *G01V 99/005* (2013.01);
(Continued)

(58) Field of Classification Search
CPC ........ G01V 1/282; G01V 1/303; G01V 1/306; G01V 2210/614; G01V 2210/6222;
(Continued)

(56) References Cited

U.S. PATENT DOCUMENTS

| 8,437,998 | B2 * | 5/2013 | Routh | G01V 1/28 703/10 |
| 8,892,410 | B2 * | 11/2014 | Krohn | G01V 1/30 703/5 |

(Continued)

FOREIGN PATENT DOCUMENTS

| WO | WO2012/041834 | 4/2012 | ............... G01V 1/30 |

OTHER PUBLICATIONS

Akcelik, V. et al. (2002) "Parallel Multiscale Gauss-Newton-Krylov Methods for Inverse Wave Propagation," *Conf. on Supercomputing, ACM/IEEE, Extended Abstracts*, 41, 15 pages.

(Continued)

*Primary Examiner* — John H Le
(74) *Attorney, Agent, or Firm* — ExxonMobil Upstream Research Company—Law Department (57) ABSTRACT

A computer-implemented method for updating subsurface models including: using an offset continuation approach to update the model, and at each stage defining a new objective function where a maximum offset for each stage is set, wherein the approach includes, performing a first stage iterative full wavefield inversion with near offset data, as the maximum offset, to obtain velocity and density or impedance models, performing subsequent stages of iterative full wavefield inversion, each generating updated models, relative to a previous stage, wherein the subsequent stages include incrementally expanding the maximum offset until ending at a full offset, wherein a last of the stages yields finally updated models, the subsequent stages use the
(Continued)

updated models as starting models, and the full wavefield inversions include constraining scales of the velocity model updates at each stage of inversion as a function of velocity resolution; and using the finally updated models to prospect for hydrocarbons.

10 Claims, 7 Drawing Sheets

(52) U.S. Cl.
CPC .............. *G01V 2210/614* (2013.01); *G01V 2210/6222* (2013.01); *G01V 2210/6224* (2013.01); *G01V 2210/6226* (2013.01); *G01V 2210/675* (2013.01)

(58) Field of Classification Search
CPC ... G01V 2210/6224; G01V 2210/6226; G01V 2210/675; G01V 99/005
USPC .......................................... 702/18, 14; 703/2
See application file for complete search history.

(56) References Cited

U.S. PATENT DOCUMENTS

| | | | |
|---|---|---|---|
| 9,702,993 B2 * | 7/2017 | Wang | G01V 1/28 |
| 2013/0311149 A1 | 11/2013 | Tang et al. | 703/2 |
| 2017/0010373 A1 | 1/2017 | Ayeni et al. | G01V 1/282 |

OTHER PUBLICATIONS

Almomin, A et al. (2013) "Tomographic Full Waveform Inversion (TFWI) by Successive Linearization and Scale Separation," *83rd Ann. Int'l Mtg., Seg Expanded Abstracts*, 9 pages.

AlTheyab, A. and G. T. Schuster (2015) "Inverting Reflections using Full-Waveform Inversion with Inaccurate Starting Model," *SEG Technical Program Expanded Abstracts*; pp. 1148-1153.

Bangerth, W. et al. (2008) "Adaptive Finite Element Methods for the Solution of Inverse Problems in Optical Tomography," *Inverse Problems*, v. 24, 23 pages.

Bunks, C. et al. (1995) "Multiscale Seismic Waveform Inversion," *Geophysics*, v. 60. No. 5, pp. 1457-1473.

Chavent, G. F. et al. (1994) "Automatic Determination of Velocities via Migration-Based Traveltime Waveform Inverstion: A Synthetic Example," *64th Ann. Int'l Mtg., SEG Exp. Abstracts*, pp. 1179-1182.

Mora, Peter (1989) "Inversion = migration + tomography," *Geophysics*, v. 54, No. 12, pp. 1575-1586.

Symes, W. W. (2008) "Migration Velocity Analysis and Waveform Inversion," *Geophysical Prospecting*, v. 56, pp. 765-790.

Tang, Y. et al. (2013) "Tomographically Enhanced Full Wavefield Inversion," *83rd Annual International Meeting, SEG Expanded Abstracts*, 32, pp. 1037-1041.

Tarantola, A. (1984) "Inversion of Seismic Reflection Data in the Acoustic Approximation," *Geophysics*, v. 49, No. 8, pp. 1259-1266.

Wang, H. et al. (2015) "Inversion of Seismic Refraction and Reflection Data for Building Long-Wavelength Velocity Models," *Geophysics*, v. 80, No. 2, pp. R81-R93.

Xie, X. and R. Wu (2002) "Extracting Angle Domain Information from Migrated Wavefield," *SEG 72nd Annual Mtg., Technical Program Expanded Abstracts*, v. 21, 4 pages.

Xie, X.-B. et al. (2006) "Wave-Equation-Based Seismic Illumination Analysis," *Geophysics*, v. 71, No. 5, pp. S169-S177.

Xu, S. et al. (2012) "Inversion of Reflected Seismic Wave," *SEG Extended Abstracts, SEG 2012 Annual Mtg.*, Las Vegas, NV, 7 pages.

Yao, G., Warner, M. (2015) "Bootstrapped Waveform Inversion: Long-Wavelength Velocities from Pure Reflection Data," *77th EAGE Conference*, 5 pages.

Ravaut, C. et al. (2004) "Multiscale Imaging of Complex Structures from Multifold Wide-Aperture Seismic Data by Frequency-Domain Full-Waveform Tomography: Application to a Thrust Belt," *Geophysical Journal Int'l*, v. 159, No. 3, pp. 1032-1056.

Shipp, R. M. et al. (2002) "Two-Dimensional Full Wavefield Inversion of Wide-Aperture Marine Seismic Streamer Data," *Geophysical Journal Int'l.*, v. 151, No. 2, pp. 325-344.

Sourbier,F. et al. (2009) "FWT2D: A Massively Parallel Program for Frequency-Domain Full-Wavefield Tomography of Wide-Aperture Seismic Data—Part 1," *Computers and Geosciences*, Pergamon Press, Oxford, GB, v. 35, No. 3, pp. 487-495.

* cited by examiner

FULL WAVEFIELD INVERSION WITH REFLECTED SEISMIC DATA STARTING FROM A POOR VELOCITY MODEL

CROSS-REFERENCE TO RELATED APPLICATION

This application claims the benefit of U.S. Provisional Patent Application 62/476,206 filed Mar. 24, 2017 entitled FULL WAVEFIELD INVERSION WITH REFLECTED SEISMIC DATA STARTING FROM A POOR VELOCITY MODEL, the entirety of which is incorporated by reference herein.

TECHNOLOGICAL FIELD

This disclosure relates generally to the field of geophysical prospecting and, more particularly, to seismic data processing. Specifically, the disclosure relates to a method for inverting the full wavefield of seismic data to infer a physical properties model of the subsurface.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

An important goal of seismic prospecting is to accurately image subsurface structures commonly referred to as reflectors. Seismic prospecting is facilitated by obtaining raw seismic data during performance of a seismic survey. During a seismic survey, seismic energy can be generated at ground or sea level by, for example, a controlled explosion (or other form of source, such as vibrators), and delivered to the earth. Seismic waves are reflected from underground structures and are received by a number of sensors/receivers, such as geophones. The seismic data received by the geophones is processed in an effort to create an accurate mapping of the underground environment. The processed data is then examined with a goal of identifying geological formations that may contain hydrocarbons (e.g., oil and/or natural gas).

Full Wavefield Inversion (FWI) is a seismic method capable of utilizing the full seismic record, including the seismic events that are treated as "noise" by standard inversion algorithms. The goal of FWI is to build a realistic subsurface model by minimizing the misfit between the recorded seismic data and synthetic (or modeled) data obtained via numerical simulation.

It has been well accepted that, for reflection dominant data, conventional FWI (e.g., Tarantola, 1984) lacks the ability to update long wavelengths of the velocity model and requires an accurate starting model to converge to a geologically meaningful result. If such conventional FWI starts with a relatively "poor" starting model, where the kinematic differences between the simulated data and the observed data are greater than half of the dominant wavelength, it often gets stuck in local minima because of cycle skipping (when the travel time difference between events simulated numerically in the computer and those acquired in the field exceeds half the period corresponding to the dominant frequency of the data).

Several FWI algorithms proposed for reflection FWI are based on scale separation between high and long wavenumber components of the velocity model (Xu 2012, Tang 2013, Tang U.S. patent application Ser. No. 13/849,270). These methods hinge on the following premise: FWI's difficulty of updating the low-wavenumber components of the model is due to the weakness of the tomographic terms in the gradient of the FWI. It is also observed that the gradient of a conventional FWI algorithm contains strong high and mid wavenumber information, but very weak low wavenumber information. For this reason, it is believed that FWI predominantly updates the short wavelength components. The proposed remedy in the above-noted documents is to enhance one term of the gradient versus the other, and recombine them to form a new gradient to improve FWI on reflection-dominant data.

The success of Xu and Tang approaches noted above is limited by the adequacy of the starting velocity model. When the starting velocity model contains strong long wavelength anomalies, the corresponding reflectors are located far from their true position, and as a result of this conventional FWI can't recover long wavelength anomalies (AlTheyab, 2015). There are several approaches for overcoming this problem. One is to use global optimization techniques, but their success is limited to very special cases due to computational complexity of the global optimization algorithms. Another approach is to use the so-called extended space methods (Symes, 2008), where the inversion space is extended in some parameter space (such as shot, offset etc.). In addition, these methods also add an extra term to the objective function as a control of coherency (flatness, focusing etc.). Although the reported results are promising, the extended space method approach is prohibitively expensive due to the computational cost. To make FWI algorithms practical for field data application, it is desirable to use local optimization methods and keep the original formulation. The present technological advancement provides a technical solution to above-noted problem of not being able to recover strong long wavelength anomalies.

SUMMARY

A computer-implemented method for updating a physical properties model of a subsurface region in an iterative inversion of seismic data using a gradient of a cost function that compares the seismic data to model-simulated data, said method comprising: using an offset continuation approach in data space to update the physical properties model, and at each stage defining a new objective function where a maximum offset for each stage is set to a given value, wherein the offset continuation approach includes, performing a first stage iterative full wavefield inversion with near offset data, as the maximum offset, to obtain velocity and density or impedance models of the subsurface region, performing subsequent stages of iterative full wavefield inversion, each generating updated velocity and density or impedance models of the subsurface region, relative to a previous stage, wherein the subsequent stages include incrementally expanding the maximum offset used for a respective stage until ending at a full offset, wherein a last of the stages yields finally updated velocity and density or impedance models, the subsequent stages of iterative full wavefield inversion use the updated velocity and density or impedance models obtained at an earlier stage as starting models, and the full wavefield inversions include constraining scales of the velocity model updates at each stage of inversion as a function of velocity resolution; and using the finally updated velocity and density or impedance models to prospect for hydrocarbons.

In the method, the constraining scales of the velocity model updates includes: defining a depth and offset dependent Gaussian smoothing operator according to the maximum offset for the respective stage; and applying the depth and offset dependent Gaussian smoothing operator to re-parametrization the starting velocity model for the respective stage, and hence constrain the scales of an update to the starting velocity model for the respective stage.

In the method, the density or impedance model parameter represents short wavelength structures.

In the method, the velocity model parameter represents mid and long wavelength structures.

In the method, the constraining scales of the velocity model updates comprises: redefining the starting velocity model using a linear transformation.

The method can further include defining a radius of the Gaussian smoothing operator at the respective stage as a function of the maximum offset used for the respective stage and as a function of seismic velocity resolution.

The method can further include, defining a radius of the Gaussian smoothing operator according to a seismic velocity resolution defined by the objective function for the respective stage, acquisition geometry and the starting velocity model for the respective stage.

The method can further include updating, via the Gaussian smoothing operator, velocity scales with a multi-scale layer stripping approach along with offset continuation.

The method can further include constraining scales of the velocity model updates comprises using an unstructured grid for velocity discretization, where a grid size of the unstructured grid follows predetermined velocity scale updates defined by velocity resolution of the objective function.

In the method, the update to the starting velocity model for the respective stage is constrained as a function of seismic velocity resolution defined mainly by the maximum offset for the respective stage.

In the method, the full wavefield inversions include, (i) inverting for the velocity and density or impedance models, and (ii) then resetting the density or impedance model to a constant model, and (iii) reinverting for the density or impedance model to improve and speed up nonlinear convergence of the full wavefield inversion.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION OF EXAMPLE EMBODIMENTS

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Due to practical considerations of field data, the present technological advancement can use local optimization methods. It is known that a local optimization method converges to the global minimum when the starting model is "close enough" to the global minimum. The set of all these starting points that guarantee convergence to the global minimum are referred as the attraction basin of the global optimum. As a result, for a local FWI optimization method to be successful, it is desirable to start with a model that is already inside the attraction basin of the global optimum. If such a starting model is not available, local optimization algorithms usually follow a continuation strategy to create one (such as offset, time, depth and frequency continuation) (Bunks, 95, Yao 2015). In continuation based approaches, FWI uses the solution of one stage as the starting point for the next one.

The proposed FWI algorithm can employ an offset continuation based approach in conjunction with scale separation.

The present technological advancement can also use the above-noted scale separation between high and low wavenumber components of the velocity model. In addition, the proposed FWI algorithm can combine two concepts: (1) continuation approach in the data space (maximum offset continuation for the objective function), and (2) re-parametrization of the inversion parameters at each continuation stage as a function of the depth and maximum offset.

The present technological advancement can use a conventional FWI formulation which doesn't require creating common image gathers. The proposed algorithm follows different stages with a continuation approach; at each stage FWI minimizes an objective function defined with a given maximum offset. FWI starts with the near offset data, and ends with the full offset data, incrementing the offset as inversion progresses. Those of ordinary skill in the art will appreciate the meaning of "near offset", and the initial cut-off for near offset data can be selected by those of ordinary skill in the art based on accuracy and speed, which are also considerations for determining increment for increasing the offset of the data. Each stage (the loop defined by steps 102, 103, and 104 in FIG. 1) uses a local optimization method. In addition, each stage uses the result from previous stage as the starting model. The maximum offset used in the objective function is increased at the end of each stage until the full data is inverted.

The inversion parametrization of the present technological advancement is based on scale separation. As inversion variables, density and re-parametrization velocity can be used (see definition below). The density is used to represent short wavelength structures (or to create a contrast model, which is a model that is mostly sensitive to the dynamics (amplitudes) of the data), and velocity is used to represent mid and long wavelength structures (Wang 2015).

As noted, the present technological advancement uses offset continuation to avoid becoming trapped to a local minimum. However, due to the ambiguity of different scales of velocity updates (or ill-posedness and rank-deficiency of FWI) the offset continuation is inadequate in avoiding local minima. In practice, false mid and short wavelength velocity updates substitute for the long wavelength updates due to the inherent ambiguity, as a result, FWI quickly gets stuck in a local minima as the data offset increases. To overcome this problem, the present technological advancement constrains the velocity updates as a function of depth and offset according to the seismic resolution of the velocity model, which can be achieved using a re-parametrization or change of variable approach (or using an adaptive unstructured grid to discretize the velocity model).

Figure 1:
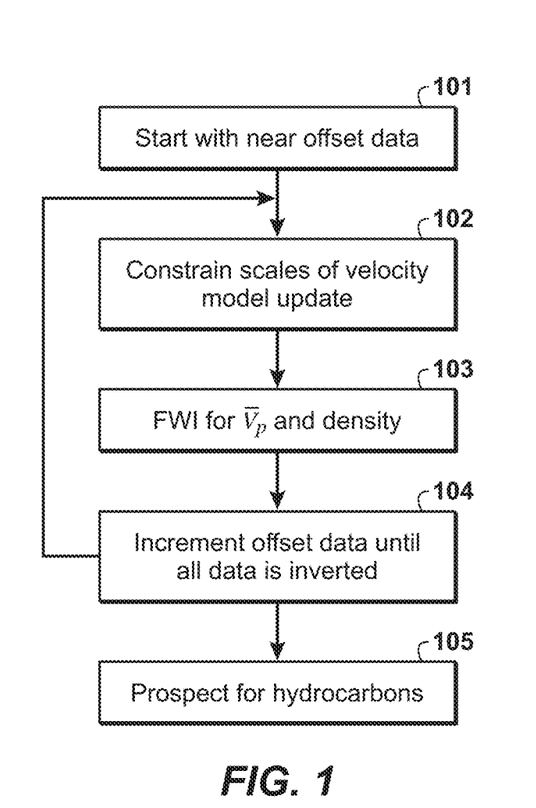
FIG. 1 illustrates a method using offset continuation and scale separation to infer for the reflected seismic data.
Figure 6:
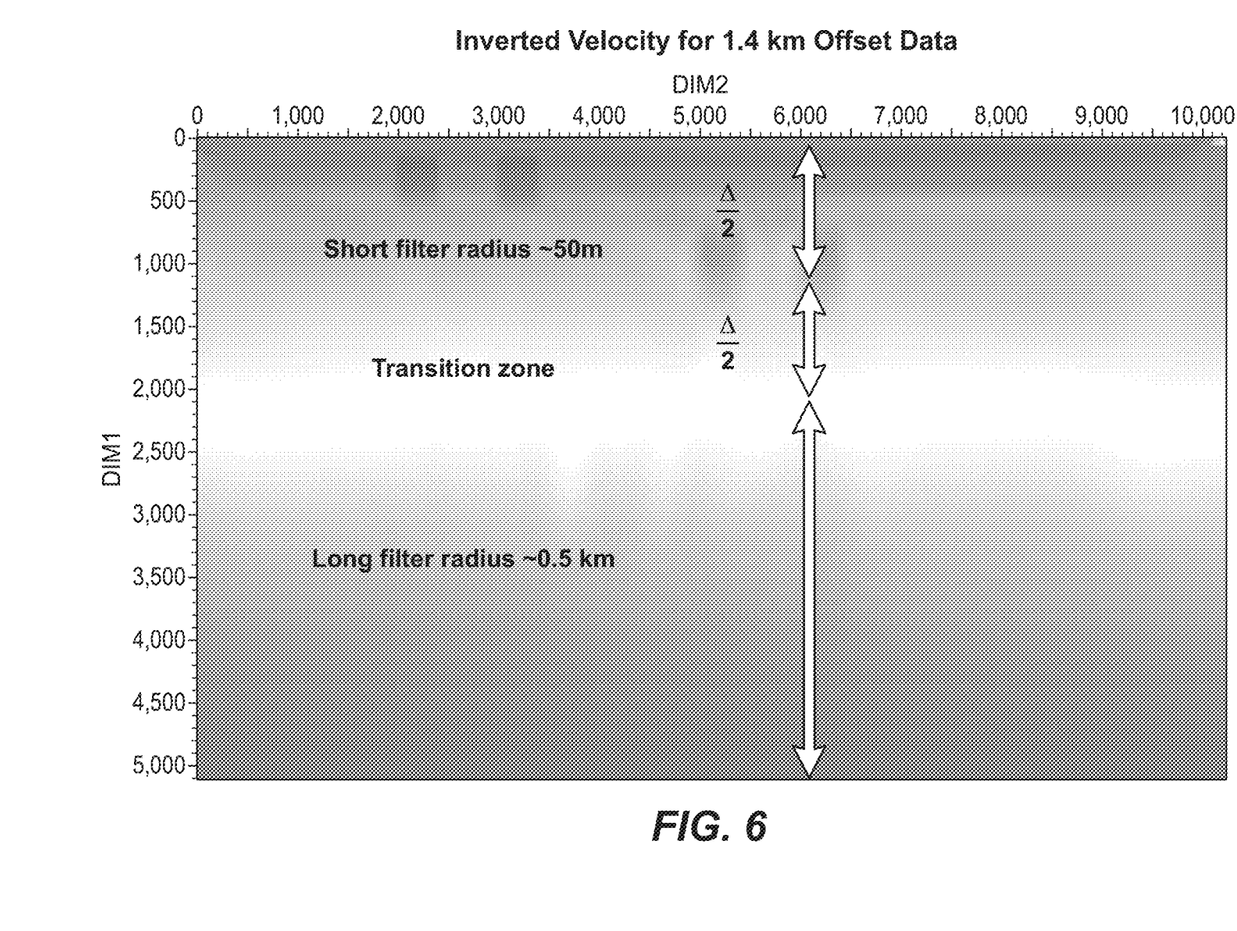
FIG. 6 illustrates an inverted velocity model using the present technological advancement with 1.4 km offset data.

At each inversion stage (FIG. 1, and the loop defined by steps 102, 103, and 104), the velocity parameter (e.g., the starting velocity model) is re-parametrization as a function of the maximum offset used in the objective function to prevent false velocity updates. In FWI, the velocity is represented by a 3D array, where each grid point is assigned a velocity value. Let's refer to the original velocity model as V and density model $\rho$, then the redefined inversion parameters using a linear transformation is $$\begin{bmatrix} \overline{V} \\ \rho \end{bmatrix} = \begin{bmatrix} S & 0 \\ 0 & I \end{bmatrix} \begin{bmatrix} V \\ \rho \end{bmatrix} \quad (1)$$

where S represents the Gaussian smoothing operator, and used to control scales of the velocity updates (FIG. 6 shows how S controls velocity updates for a synthetic example), and I is the identity matrix. The Gaussian smoothing at a given cell location $x_c$ is $$S_{x_c} = e^{\frac{-(x-x_c)^2}{\sigma}} \quad (2)$$

where the constant $\sigma$ defines the Gaussian filter size and changes as a function of cell location $x_c$.

FIG. 6 shows an inverted velocity model for 1.4 km offset data. For shallow parts (depth <700 m), the filter radius (max offset used) is set to 50 m, and for deep parts (depth >1,400 m) the radius is set to 500 m. In the transition zone (from 700 m to 1,400 m), the radius can change linearly from 50 m to 500 m. However, such change does not necessarily have to be linear. FIG. 6 shows that for shallower depths, S controls the velocity updates to have a finer resolution for smaller scale structures in the shallower regions and a coarser resolution for larger scales regions of greater depth. When using the Gaussian smoothing operator, the radius for the current stage can be defined as a function of the maximum offset used for the current stage and as a function of seismic velocity resolution. Alternatively, the radius for the current stage can be defined according to seismic velocity resolution defined by the objective function. The radius should not be smaller than the velocity resolution, in order not to allow updated finer than the resolution.

First it is noted that re-parametrization is only applied to the velocity variable and not to density. Although the original velocity model V represents (and its updates admit) all the scales (short, mid and long wavelength structures), the transformed variable suppresses some of the mid and short wavelength velocity scales depending on the local Gaussian filter size. The filter size or radius changes with the depth and hence the scales of the velocity update are also depth dependent. As shown by the loop in FIG. 1, the Gaussian smoothing operator is also a function of the maximum offset used in the objective function. The purpose of the filter is to prevent contradicting updates of different velocity scales, and to recover unknown velocity anomalies using a multi-scale (similar to a layer stripping) approach along with the offset continuation (FIG. 6). In other words, re-parametrization used to update the velocity model according to the seismic velocity resolution. As the data offset increases, the smoothing filter size becomes shorter at the shallow parts to allow more mid and short wavelength updates into the velocity model (i.e., scale separation is achieved with smaller scale structures having greater resolution in the shallows parts).

Setting Gaussian Operator S:

In practice, to define the Gaussian smoother filter size, the computation domain is divided into three parts (FIG. 6), where the size of each part is defined with the maximum offset used in the data. The first part covers the areas shallower than the half offset depth. The second part is the transition area which covers areas shallower than one offset and deeper than half offset depth. The third part covers areas deeper than one offset depth. In the first area the filter size is set to approximately one wavelength, and in the third area the filter size is set to 10 wavelengths. In the second area, the filter size is linearly transitioned from one wavelength to ten wavelengths (FIG. 6). However, other non-linear transitions could be developed. These values can also be found with numerical experimentation.

As noted, the objective of re-parametrization with Gaussian smoothing is to constrain the scales of the velocity updates. The same goal can be achieved with alternative methods. Another approach is to use an adaptive grid for discretizing the velocity parameter. In this case, the grid for the wave propagator and velocity discretization are different from each other. The grid for the wave propagator follows numerical accuracy requirements of the wave equation. But the grid for the velocity discretization can be adaptive, typically coarser than wave propagation grid, the cell size is not uniform, and the cell size adaptively changes following the desired scales of the velocity updates. The unstructured grid can follow predetermined velocity scale updates defined by the velocity resolution of the objective function. In this alternative, one can use unstructured mesh or other alternative discretization methods (such as octree) to discretize the velocity parameter (Bangerth, 2008).

A flowchart of the proposed technological advancement is shown in FIG. 1. In step 101, the method starts with the near offset data. At this stage, FWI starts with a given smooth starting velocity model (if nothing available then a model with increasing depth, e.g. linearly), and a constant density model. Step 102 includes re-parameterizing the starting or initial velocity model. There are multiple ways to accomplish this, including but not limited to, Gaussian smoothing and adaptive grid techniques. When using the Gaussian smoothing operator, step 102 includes defining the Gaussian smoothing operator for the near offset data. As explained above, there is almost no velocity resolution for the near offset data, and hence the filter size is set to 10 wavelengths almost everywhere, except at the very shallow areas. In step 103, using the FWI workflow, the density and velocity are inverted for using the near offset data.

FWI is a computer-implemented geophysical method that is used to invert for subsurface properties, such as velocity or acoustic impedance. The crux of any FWI algorithm can be described as follows: using a starting subsurface physical property model, synthetic seismic data are generated, i.e. modeled or simulated, by solving the wave equation using a numerical scheme (e.g., finite-difference, finite-element etc.). The term velocity model or physical property model as used herein refers to an array of numbers, typically a 3-D array, where each number, which may be called a model parameter, is a value of velocity or another physical property in a cell, where a subsurface region has been conceptually divided into discrete cells for computational purposes. The synthetic seismic data are compared with the field seismic data and using the difference between the two, an error or objective function is calculated. Using the objective function, a modified subsurface model is generated which is used to simulate a new set of synthetic seismic data. This new set of synthetic seismic data is compared with the field data to generate a new objective function. This process is repeated within step 103 until the objective function is satisfactorily minimized and the final subsurface model is generated. A global or local optimization method is used to minimize the objective function and to update the subsurface model.

Using the definition (1) of the new velocity variable, the gradient for the new velocity variable can be obtained by simply using chain rule $$g_{\overline{V}} = S^T g_V \quad (3)$$

where $g_V$ is the gradient of the objective function with respect to V. If one uses steepest descent for the numerical method, the search direction p for V is given by $$p = -SS^T g_V \quad (4)$$

Similar expression can be derived for other optimization techniques (such as truncated Gauss-Newton method).

The full wavefield inversions can include (i) inverting for the velocity and density or impedance models, and (ii) then resetting the density or impedance model to a constant model, and (iii) reinverting for the density or impedance model to improve and speed up nonlinear convergence of the full wavefield inversion.

After converging to the global optimum, step 104 includes increases the data offset, and redefine the smoothing operator S for the new offset, until all the data is inverted. Using the new objective function, and new smoothing operator, the method inverts for the density and velocity models. This process continues (i.e., steps 102-104 are repeated) until the full data is explained.

In step 105, the final subsurface physical property models can be used to prospect for hydrocarbons or otherwise be used in hydrocarbon management. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. For, example, prospecting can include causing a well to be drilled that targets a hydrocarbon deposit derived from the subsurface image.

Numerical Example

Figure 2A:
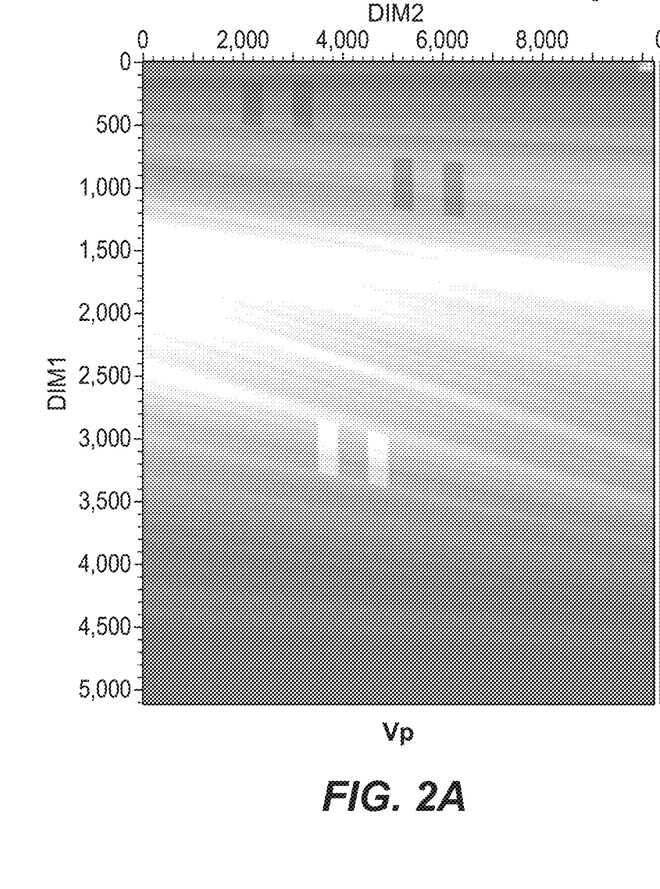
FIG. 2A illustrates a true velocity model.
Figure 2B:
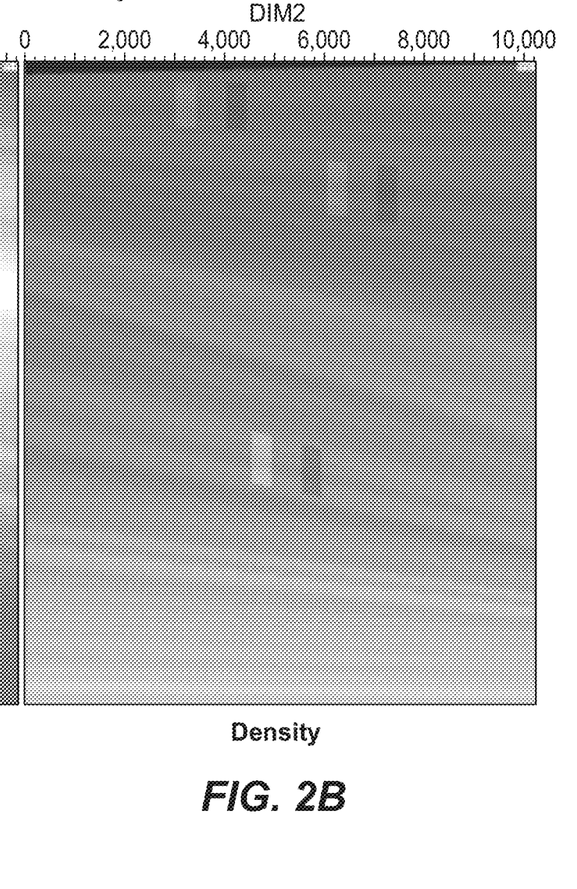
FIG. 2B illustrates a true density model.
Figure 3A:
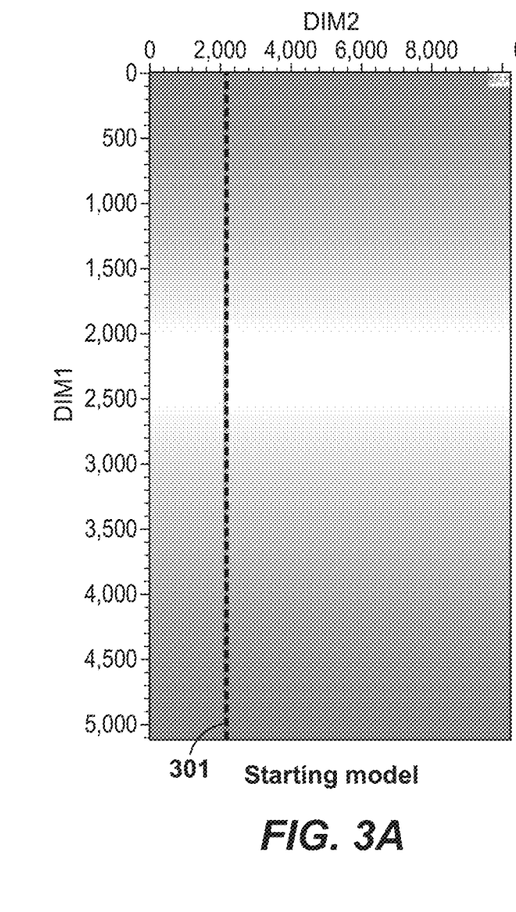
FIGS. 3A, 3B, and 3C compare a starting velocity model, a true velocity model, and a pseudo-well, respectively.
Figure 3B:
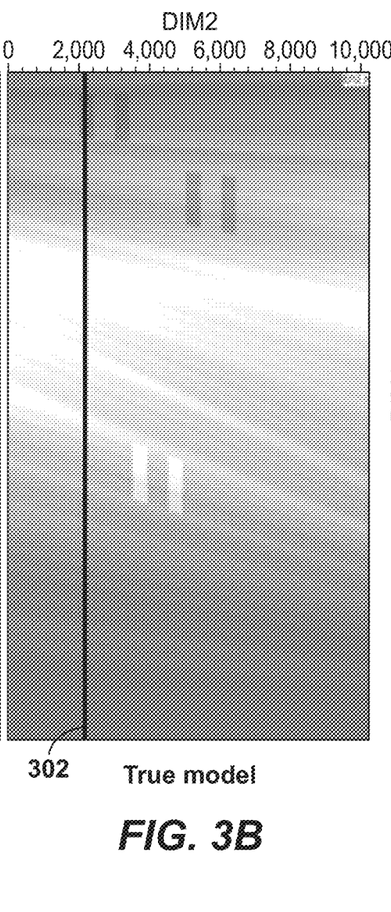
Figure 3C:
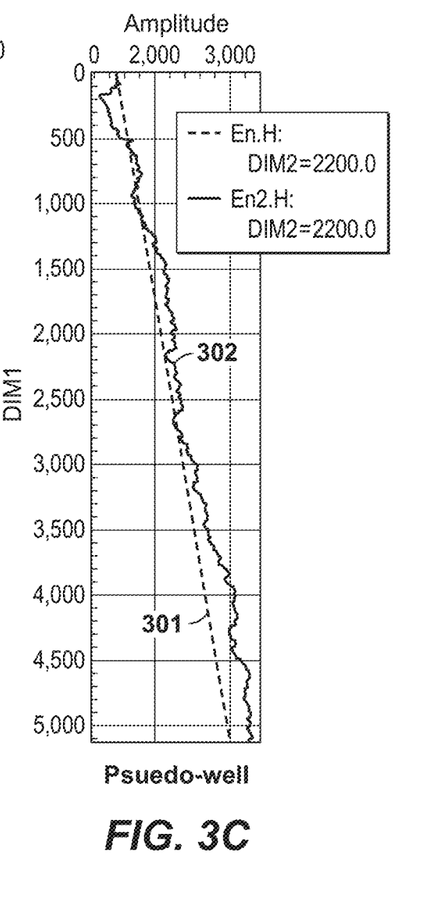

An FWI example is provided with a synthetic acoustic model (FIGS. 2A and B). FIG. 2A illustrates a true velocity model VP and FIG. 2B illustrates a true density model. The starting and true velocity models are shown in FIGS. 3A and 3B. A pseudo-well shows that the starting model 301 has significant long wavelength anomalies when compared to the true model 302 (FIG. 3C). As a seismic source, we use Ricker wavelength with 15 Hz median frequency. The sources and receivers represent a marine data acquisition where the maximum offset is set to 8 km. The computational domain is 5 km depth, and 10 km wide.

Figure 4A:
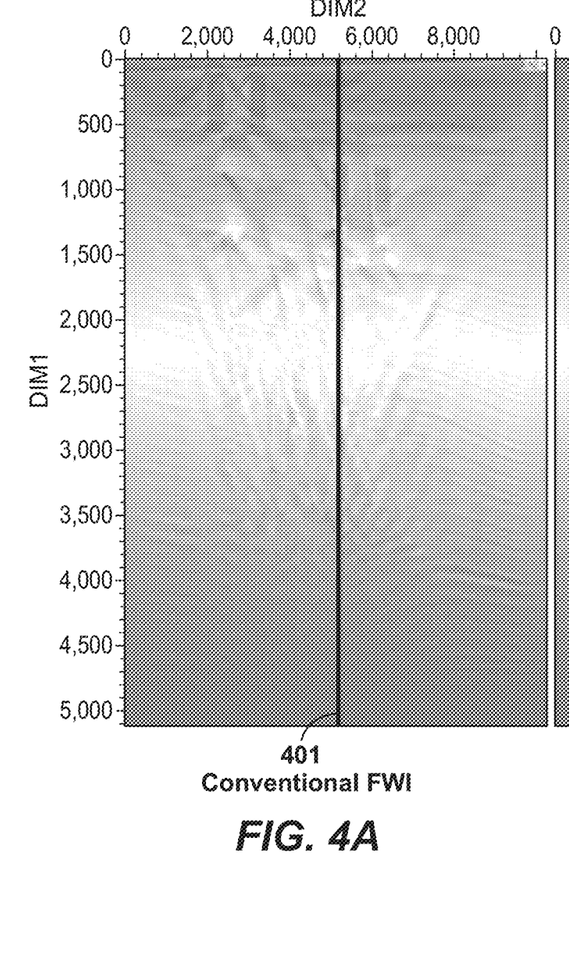
FIGS. 4A, 4B, and 4C illustrates an inverted velocity model from a conventional FWI algorithm, the starting velocity model, and a pseudo-well, respectively.
Figure 4B:
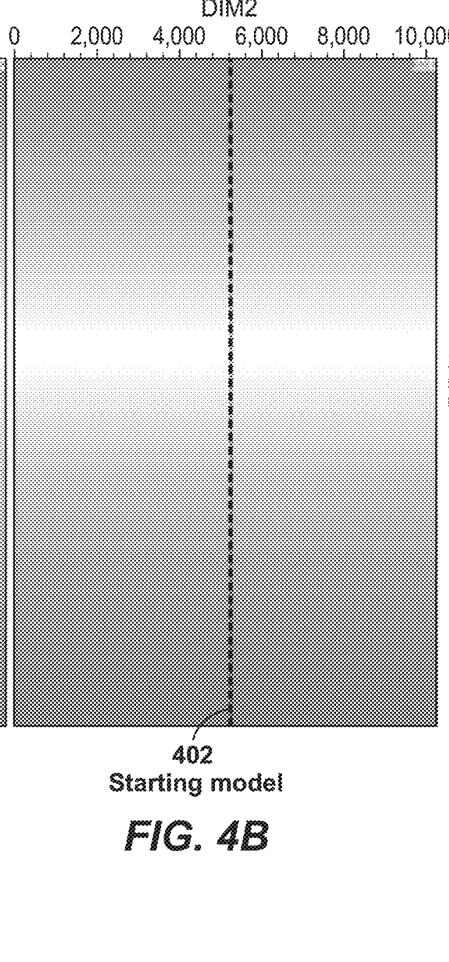
Figure 4C:
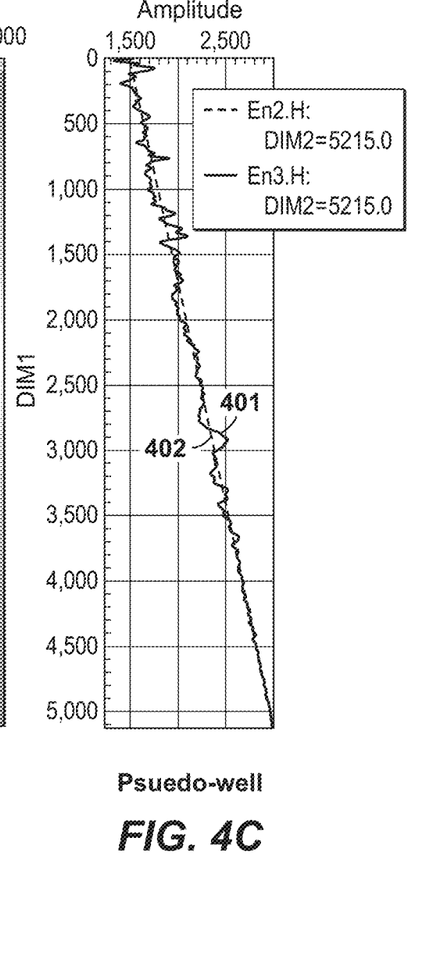

FIG. 4A shows the inverted velocity result obtained using conventional FWI, with FIG. 4B illustrating the starting model. As expected, conventional FWI yields a poor result due to cycle skipping. FIG. 4C shows the pseudo-well at the center part of the domain for inverted velocity model 401 and starting velocity model 402. For this test problem, the conventional FWI cannot recover long wavelength anomalies or cannot add long wavelength updates to the starting model (i.e., the velocity model at greater depths has not been updated much relative to the starting model as the longer wavelengths that sample deeper are not being recovered or updated). The inverted velocity model includes only mid and short wavelength velocity updates.

Using the same problem, the present technological advancement yields superior results. As discussed, the present technological advancement starts with the near offset data and ends with full offset data (8 km). At each stage, the proposed technological advancement minimizes an FWI objective function defined by the maximum data offset for that stage. For this problem, the present technological advancement starts with 0.5 km offset data, and increase the offset by 0.3 km at each stage.

Figure 5A:
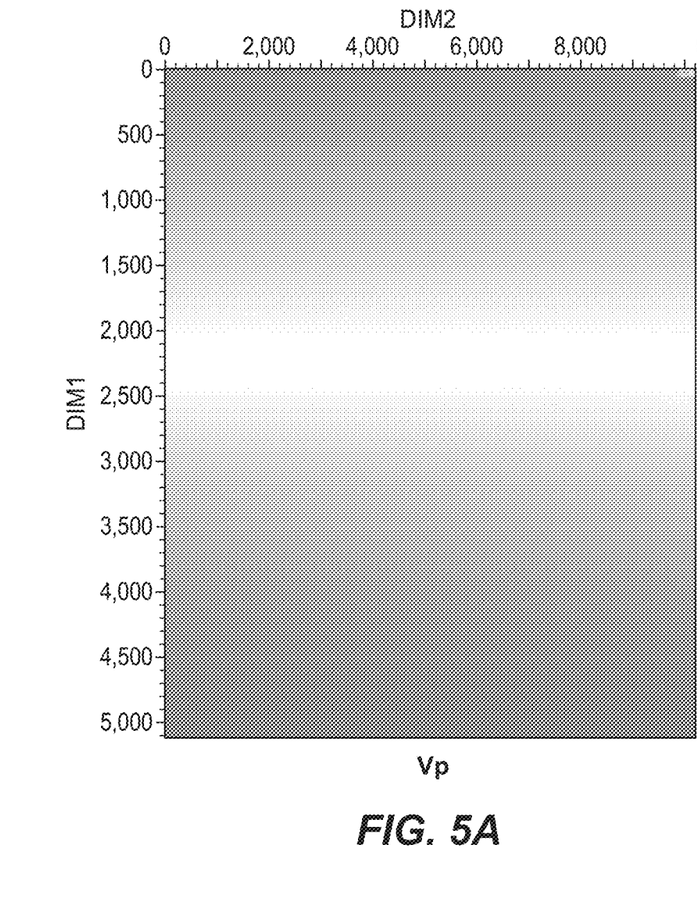
FIGS. 5A and 5B illustrate an inverted velocity model and an inverted density model, respectively, using the present technological advancement with 0.5 km offset data.
Figure 5B:
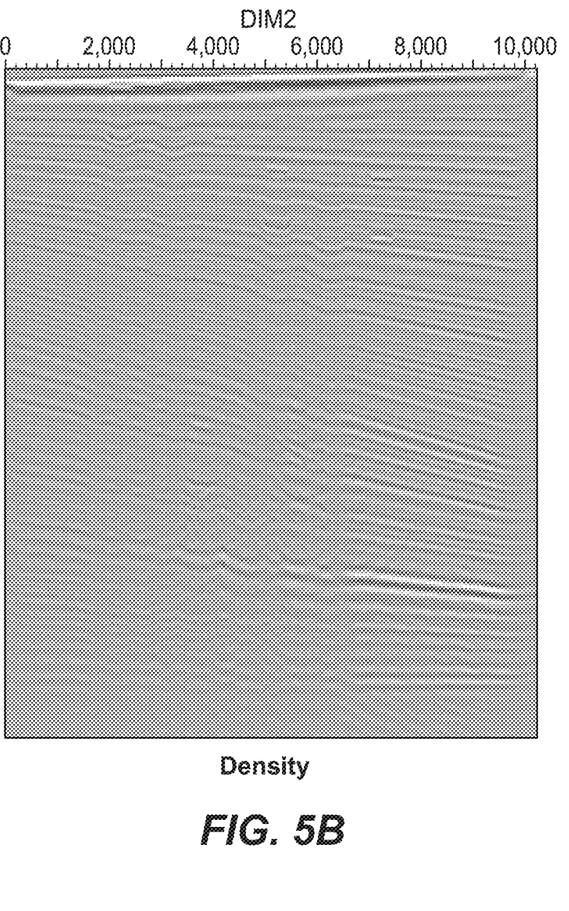

The inverted velocity and density models for the near offset data (0.5 km) are shown in FIGS. 5A and 5B, respectively. The inverted models explain the data with high precision, and represent a global minimum for the near offset data. The near offset data travel-time gradient is (almost) zero and there is almost no velocity resolution. As shown in FIG. 5, there is very little update to the velocity model, relative to the starting model in FIG. 4B (except in very shallow areas). The Gaussian smoothing operator suppresses all mid and short wavelength updates, and FWI yields a result where the contrast (or density) model is almost good enough to represents the near offset data. In short, the Gaussian smoothing operator creates "the coarsest" velocity model that can fit the given data.

Figure 7A:
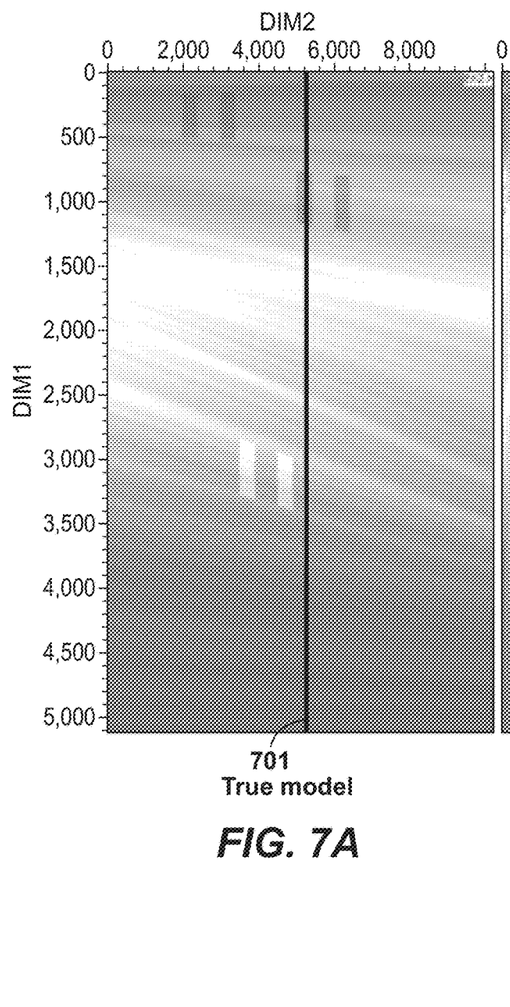
FIGS. 7A, 7B, and 7C illustrate a truce velocity model, an inverted velocity model using the present technological advancement with 8 km offset data, and a pseudo-well, respectively.
Figure 7B:
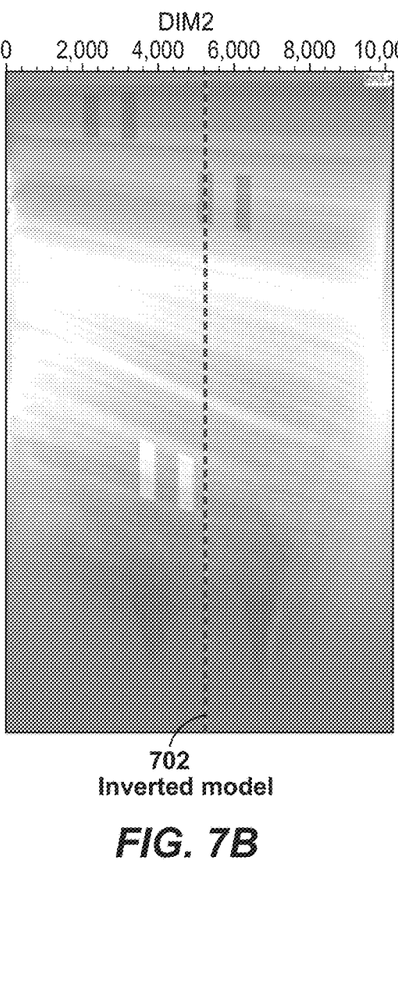
Figure 7C:
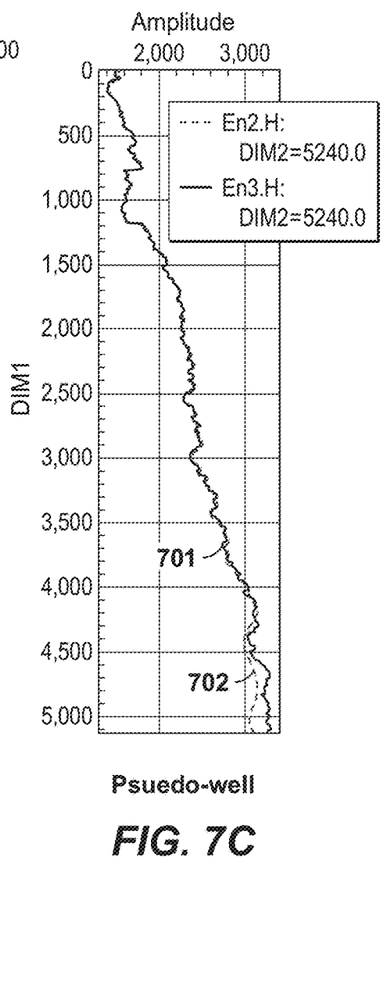

The final inverted velocity result is shown in FIG. 7B which explains the data at the full offset (8 km). FIG. 7A is the true velocity model. The inverted models explain the observed data with high precision. FIG. 7C shows a pseudo-well along the center part of the domain where true 701 and inverted 702 velocity models are in good agreement.

The present technological advancement progresses by increasing the data offset. As the data offset increases, the velocity update allows more mid and low wavelength anomalies, starting from the shallow areas. For instance, the inverted velocity for 1.4 km maximum offset is shown in FIG. 6. At this offset, the velocity resolution at the shallow parts (areas shallower than 0.7 km) has very good resolution. In addition, as seen in FIG. 6, the velocity resolution decreases with depth.

In all practical applications, the present technological advancement must be used in conjunction with a computer, programmed in accordance with the disclosures herein. Preferably, in order to efficiently perform FWI, the computer is a high performance computer (HPC), known as to those skilled in the art, Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The foregoing application is directed to particular embodiments of the present technological advancement for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, some or all of the steps in the present inventive method are performed using a computer, i.e. the invention is computer implemented. In such cases, the resulting gradient or updated physical properties model may be downloaded or saved to computer storage.

The following references are incorporated herein by reference in their entirety:

Bunks, C., F. M. Saleck, S. Zaleski, and G. Chavent (1995) "Multiscale Seismic Waveform Inversion," *Geophysics*, v. 60, pp. 1457-1473;

Mora, P. (1987) "Elastic Wavefield Inversion: PhD thesis," Stanford University, pp. 22-25, 1989, Inversion=migration+tomography: *Geophysics*, v. 54, pp 1575-1586;

Xie, X., and R. Wu (2002) "Extracting Angle Domain Information from Migrated Wavefield," *SEG Technical Program Expanded Abstracts*, v. 21, pp. 1360-1363;

Xie, X.-B., S. Jin and R.-S. Wu (2006) "Wave-Equation-Based Seismic Illumination Analysis," *Geophysics*, v. 71, no. 5, pp. S169-S177;

AlTheyab, A. and G. T. Schuster (2015) "Inverting Reflections using Full-Waveform Inversion with Inaccurate Starting Model," *SEG Technical Program Expanded Abstracts*; pp. 1148-1153;

Symes, W. S. (2008) "Migration Velocity Analysis and Waveform Inversion," *Geophysical Prospecting*, v. 56, pp. 765-790;

Yao, G., Warner, M. (2015) "Bootstrapped Waveform Inversion: Long-Wavelength Velocities from Pure Reflection Data," 77th *EAGE Conference;*

Wang, H., S. C. Singh, F. Audebert, and H. Calandra (2015) "Inversion of Seismic Refraction and Reflection Data for Building Long-Wavelength Velocity Models," *Geophysics*, v. 80, no. 2, pp. R81-R89;

Tang, Y., S. Lee, A. Baumstein, D. L. Hinkley (2013) "Tomographically Enhanced Full Wavefield Inversion," 83rd *Annual International Meeting*, SEG Expanded Abstracts, 32, pp. 1037-1041;

Tang, Y., S. Lee, A. Baumstein, D. L. Hinkley (2013) "Tomographically Enhanced Full Wavefield Inversion," U.S. Patent publication US2013/0311149, 19 pages;

Tarantola, A. (1984) "Inversion of Seismic Reflection Data in the Acoustic Approximation," *Geophysics*, v. 49, no. 8, pp. 1259-1266; and Xu, S., Wang, D., Chen, F., Lambare, G., Zhang, Y. (2012) "Inversion of Reflected Seismic Wave, *SEG Extended Abstracts, SEG* 2012 *Annual Mtg., Las Vegas, N.V.,* 8 pages.

The invention claimed is:

1. A computer-implemented method for updating a physical properties model of a subsurface region in an iterative inversion of seismic data using a gradient of a cost function that compares the seismic data to model-simulated data, said method comprising:

using an offset continuation approach in data space to update the physical properties model, and at each stage defining a new objective function where a maximum offset for each stage is set to a given value, wherein the offset continuation approach includes, performing a first stage iterative full wavefield inversion with near offset data, as the maximum offset, to obtain velocity and density or impedance models of the subsurface region, and performing subsequent stages of iterative full wavefield inversion, each generating updated velocity and density or impedance models of the subsurface region, relative to a previous stage, wherein the subsequent stages include incrementally expanding the maximum offset used for a respective stage until ending at a full offset, wherein a last of the stages yields finally updated velocity and density or impedance models, the subsequent stages of iterative full wavefield inversion use the updated velocity and density or impedance models obtained at an earlier stage as starting models, and the full wavefield inversions include constraining scales of the velocity model updates at each stage of inversion as a function of velocity resolution, wherein the constraining scales of the velocity model updates comprises:

defining a depth and offset dependent Gaussian smoothing operator according to the maximum offset for the respective stage; and applying the depth and offset dependent Gaussian smoothing operator to re-parameterize the starting velocity model for the respective stage, and hence constrain the scales of an update to the starting velocity model for the respective stage; and using the finally updated velocity and density or impedance models to prospect for hydrocarbons.

2. The method of claim 1, wherein the density or impedance model parameter represents short wavelength structures.

3. The method of claim 1, wherein the velocity model parameter represents mid and long wavelength structures.

4. The method of claim 1, wherein the constraining scales of the velocity model updates comprises: redefining the starting velocity model using a linear transformation.

5. The method of claim 1, further comprising defining a radius of the Gaussian smoothing operator at the respective stage as a function of the maximum offset used for the respective stage and as a function of seismic velocity resolution.

6. The method of claim 1, further comprising defining a radius of the Gaussian smoothing operator according to a seismic velocity resolution defined by the objective function for the respective stage, acquisition geometry and the starting velocity model for the respective stage.

7. The method of claim 1, further comprising updating, via the Gaussian smoothing operator, velocity scales with a multi-scale layer stripping approach along with offset continuation.

8. The method of claim 1, wherein the constraining scales of the velocity model updates comprises using an unstructured grid for velocity discretization, where a grid size of the unstructured grid follows predetermined velocity scale updates defined by velocity resolution of the objective function.

9. The method of claim 1, wherein the update to the starting velocity model for the respective stage is constrained as a function of seismic velocity resolution defined mainly by the maximum offset for the respective stage.

10. The method of claim 1, wherein the full wavefield inversions include, (i) inverting for the velocity and density or impedance models, and (ii) then resetting the density or impedance model to a constant model, and (iii) reinverting for the density or impedance model to improve and speed up nonlinear convergence of the full wavefield inversion.

\* \* \* \* \*